F. R. BATCHELDER.
WOVEN CARRIER.
APPLICATION FILED MAY 23, 1916.

1,211,275.

Patented Jan. 2, 1917.
6 SHEETS—SHEET 1.

Witness.
Ivan G. Blake

Inventor
Frank R. Batchelder
by Chas. F. Randall
Attorney

F. R. BATCHELDER.
WOVEN CARRIER.
APPLICATION FILED MAY 23, 1916.

1,211,275.

Patented Jan. 2, 1917.
6 SHEETS—SHEET 6.

Witness:
Ivan A. Blake

Inventor:
Frank R. Batchelder
by Chas. F. Randall
Attorney

UNITED STATES PATENT OFFICE.

FRANK R. BATCHELDER, OF WORCESTER, MASSACHUSETTS.

WOVEN CARRIER.

1,211,275.   Specification of Letters Patent.   Patented Jan. 2, 1917.

Application filed May 23, 1916. Serial No. 99,322.

*To all whom it may concern:*

Be it known that I, FRANK R. BATCHELDER, a citizen of the United States, residing at Worcester, in the county of Worcester, State of Massachusetts, have invented a certain new and useful Improvement in Woven Carriers, of which the following is a specification, reference being had therein to the accompanying drawings.

The invention has relation to pocketed carriers made of woven material, namely carriers on the order of those which are used for holding and carrying cartridges, packaged first-aid supplies, etc.

Among the pocketed carriers to which the invention is applicable are comprised cartridge-carriers, hospital corps belts, medical officers' belts, and others having various special adaptations.

More particularly, the invention relates to the covers which are provided in connection with the pockets of carriers of the said general class.

Carriers of the general class in question, made of flexible woven material and sometimes known as woven carriers, have been provided heretofore with cover-flaps made of flexible woven material. Almost invariably, however, the ordinary pocket cover or flap has been a mere strip of web, pointed, equipped with a fastener, and drawn from back to front over the mouth or opening of the pocket. This form of cover has not constituted a complete closure for the opening of the pocket, but on the contrary has left it possible for water to enter between the cover and the edge of the pocket; also for dust to penetrate easily into the pocket while troops are on the march; and also for cartridges or similar small objects to become lost from the pocket, particularly with mounted troops on the trot, or when the wearer of the carrier is lying down.

None of the covers or flaps of woven material employed up to the present time meets satisfactorily the purposes of the present invention, in respect of being capable of affording complete protection to the contents of a pocket as well as effectually safe-guarding against accidental escape of such contents, and in other respects. So far as I am aware, it has never been perceived heretofore how to make out of woven material an effective and practical cover which will thus meet the said purposes. Woven fabric is not as well adapted as leather to be made up and used in cut, shaped, and stitched form, and accordingly only simple forms of cover-flaps have been employed in connection with the carriers aforesaid. These simple forms of cover-flaps afford only incomplete or inadequate protection, but nothing better than a simple or practically plain cover-flap of woven material has entered into use. On the other hand, woven material has been found better than leather in different practical respects for use in the case of pocketed carriers, for instance as regards durability and capacity to withstand climatic conditions, and by reason of its greater flexibility. It can be produced of greater strength with less weight, and of greater uniformity in strength and other desirable qualities. It therefore is used in the manufacture of pocketed carriers, notwithstanding the drawbacks and disadvantages which restrict its capabilities and prevent it from being shaped by cutting, and the parts or pieces from being applied, united and combined in the same manner in which leather might be. The comparative flexibility of woven material is at one and the same time an advantage and a drawback or disadvantage, the drawback or disadvantage residing in the fact that woven pockets do not have the requisite stiffness to enable them to retain definite shapes accurately. Another drawback or disadvantage is that the cut edges of woven material are objectionable. They fray and present projecting and loose ends of threads, unless they are bound with tape or webbing or turned or folded in. When cut margins are united by stitches, the seams do not hold reliably unless the material is turned or folded over upon itself, in which case the bulkiness of the two or more thicknesses comprised in a folded-over portion frequently is objectionable and undesirable.

The invention has for its general object the production of a practical improved flexible cover which shall afford complete protection for the contents of the pocket with which it is combined, by effectually excluding moisture, mud, sand and dust; which shall effectually insure against the escape of articles (as for instance, cartridges in the case of a cartridge-carrier); and which shall be of a construction enabling the drawbacks or disadvantages of woven material, above referred to, to be avoided or be properly taken care of.

The invention provides a woven carrier comprising a body-web and a woven pocket projecting from the face of the said web, with a cover comprising essentially a hood of flexible material, flexibly united with the back of the pocket, having a front which extends down in front of the front wall of the said pocket, and side-skirts which extend down alongside the sides of the pocket, and prevent the existence of openings at the opposite sides of the closed and covered pocket. Certain features of the invention provide for giving the top of the hood-like cover a well-defined rectangularity and an area corresponding with the cross-section of the filled pocket, and for causing the side-skirts to form well-defined angles with the said top.

A pocket cover made in conformity with my invention constitutes a complete covering and protection against the entrance of water, dust, etc., and against the escape of small objects contained in the pocket. It is especially valuable in the case of belts carrying hospital corps supplies, these supplies frequently including packets of gauze thinly wrapped in muslin or paper, and similar first aid and medical packages. It is important also where troops are required to carry not merely the ordinary cartridges arranged in clips but paper boxes or cartons containing clips as packed at the cartridge-making factory. It is desired in some countries, for example, to issue to the troops sealed cartons which are not to be opened except firing orders are given. These packages are of light paper and if exposed to the weather speedily become softened or weakened and broken. By means of a pocket cover made according to my invention, effective protection is afforded in these different cases.

The drawings represent various illustrative embodiments of the features of the invention.

The body or band-portion of a belt or carrier is marked 1 in each of the different views in which it appears, and the pocket is marked 2. As shown, the said body or band-portion and pocket are formed of flexible woven material, and are produced integral with each other by proper procedure in weaving. Only one pocket is shown in each instance, and when desired a carrier may consist of or be provided with a single pocket, but usually in practice a carrier is furnished with a plurality of pockets. The invention is applicable in either case. In the various views showing pockets the latter are represented, by way of illustration, as filled and expanded by packages 3, 3, such as commonly contain the supplies that are furnished to the hospital corps. The filled pockets in these instances are substantially rectangular in cross-section.

In the case of each embodiment shown herein the cover is secured in place in proper relations with the pocket by means of a rearward extension from the top of the cover. This extension is made fast in some approved manner at the back of the pocket. Preferably it is inserted into a housing slit provided in the upper portion of web 1, as shown in the drawings, in which slit it is secured in practice by means of stitches or other convenient fastenings. The said housing slit is of the character of the housing slits shown, described and claimed in U. S. Letters Patent No. 1,139,629 granted to me under date of May 18, 1915. Its employment is preferred, but is not indispensable.

Figure 1:
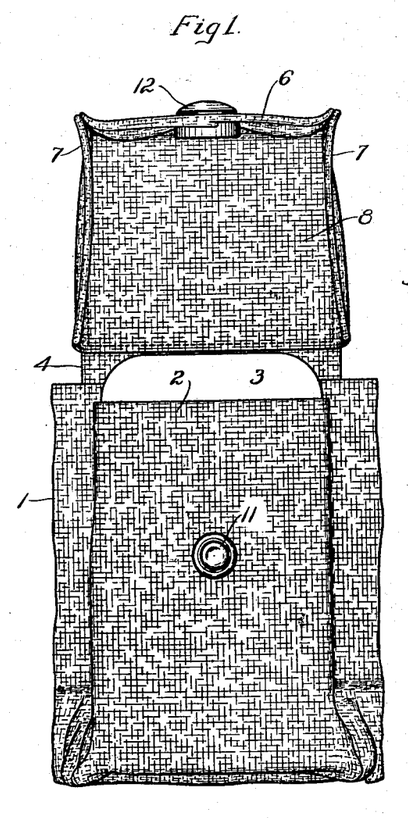
Figure 1 of the drawings is a front view of a short portion of a hospital corps belt, showing one of the pockets thereof with the hood-like cover raised and the pocket filled with packages, and showing, further, one of the said illustrative embodiments.
Figure 2:
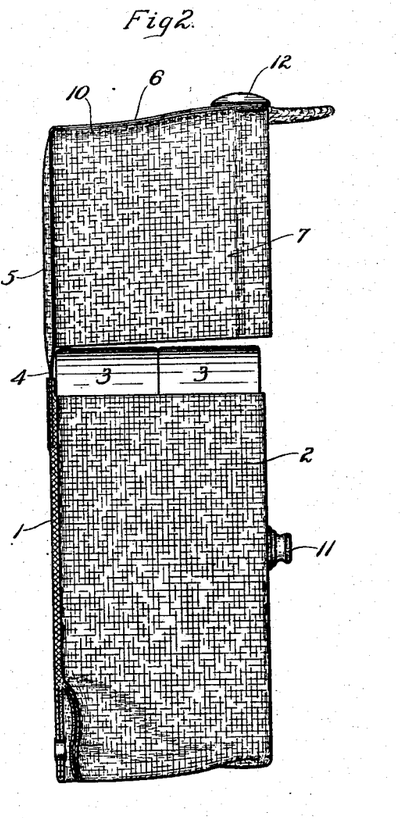
Fig. 2 is a view of the same from the left-hand side in Fig. 1.
Figure 3:
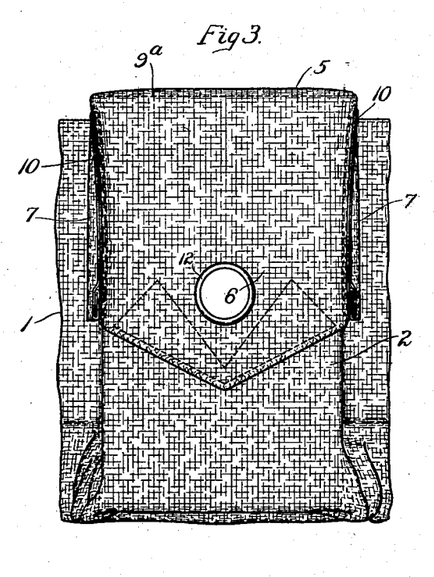
Fig. 3 is a front view, Fig. 4 a side view, and Fig. 5 a top view showing the cover closed down in place and fastened.
Figure 4:
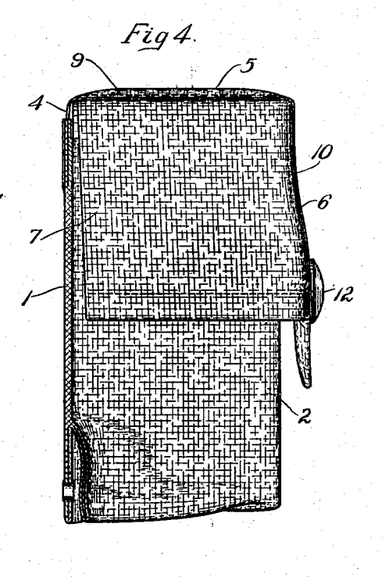
Figure 5:
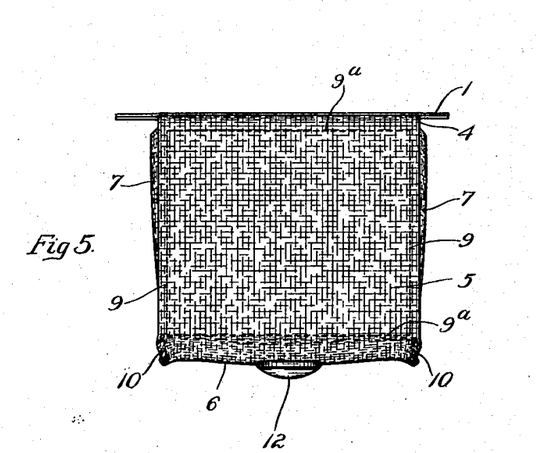

In the embodiment shown in Figs. 1 to 5 the cover is composed of two strips of woven material fastened together in the required relations. One of such strips extends from front to rear and forms the rearward extension 4, and also one thickness of the top 5 of the cover, and the front 6 of the cover. The other strip extends transversely and forms the two side-portions, wings, or skirts, 7, 7, of the cover and one, 8, Fig. 1, of the thicknesses of the top of the cover. At 9, 9, 9ª, 9ª, Figs. 3, 4 and 5 are lines of stitches by which the two thicknesses composing the cover-top are fastened together. Lines 9, 9, are parallel with and close to the side-edges of the strip that extends from front to rear, such strip being a little wider than the filled pocket is from side to side. The transverse strip is a little wider than the filled pocket is from front to rear, and the lines 9ª, 9ª, of stitches are parallel with and close to the front and rear edges of the said strip. Other lines of stitches may be applied, and other or additional means for securing the two strips together. The end-portions of the transverse strip are bent at right angles at the opposite sides of the other strip to produce the side-wings or skirts 7, 7, and the latter strip is bent at right angles at the front edge of the transverse strip to produce the front 6. The front edges of the wings or skirts, 7, 7, are united to the side edges of front 6 by lines of stitches 10, 10, or other connecting means. The free end of front 6, and free edges of skirts 7, 7, are folded back upon themselves, or hemmed, as shown, to hide and protect cut edges and give smooth firm edges that will not fray or ravel.

The top 5 of the cover made as just explained has a well-defined rectangularity closely corresponding in area and general proportions with the cross-section of the filled and expanded pocket, and the side-wings or skirts form well-defined angles with the said top, and with the front. The width of the strip that extends from front to rear, and distance apart of the lines 9, 9, of stitches, determine the lateral measurement of the top, and the width of the transversely-extending strip determines its measurement from front to rear. Thus the cover has and retains a shape corresponding with that of the filled and expanded pocket. When it is closed down into place as in Figs. 3, 4, 5, it constitutes a complete protecting hood for the pocket. As will be seen in the said views, the skirts or side-wings 7, 7, close in the spaces at opposite sides of the top of the pocket so that there are no openings such as exist at such places when the old-style cover-flaps are employed. The entrance of rain, snow, sand, mud, or other matter at such places is prevented, and small articles contained within a pocket cannot escape.

Fastening means is provided for the purpose of holding the cover or hood securely closed. The drawings show means of usual character comprising a stud 11 applied to and projecting from the front wall of the pocket, and a coöperating socket 12 applied to the front 6 of the cover or hood.

Preferably, though not necessarily in all cases, strips of webbing woven of the proper width with firm woven selvages are employed in the construction of the cover or hood, thereby rendering unnecessary folding or hemming of the longitudinal edges of such strips, and avoiding bulkiness of the securing seams. When a selvaged transverse strip is employed, the rear edges of the side-wings or skirts are selvage edges. The double cloth top over the opening of the pocket gives a double water-proofing protection to the contents of the pocket. In case a cover on the order of that shown in Figs. 1 to 5 but having only a single thickness of material in the top thereof is desired, separate wing or skirt pieces may be secured by their top or top and front edges to the lateral edges of the top or top and front, respectively, formed by the strip that extends from front to rear.

Figure 6:
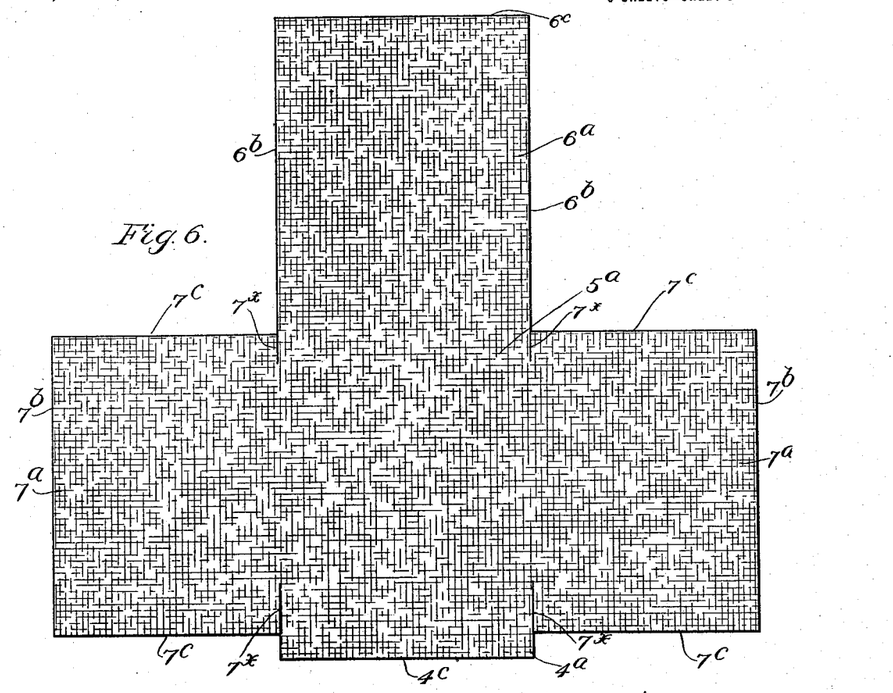
Fig. 6 shows a blank which may be used in making a second embodiment.
Figures 7, 8:
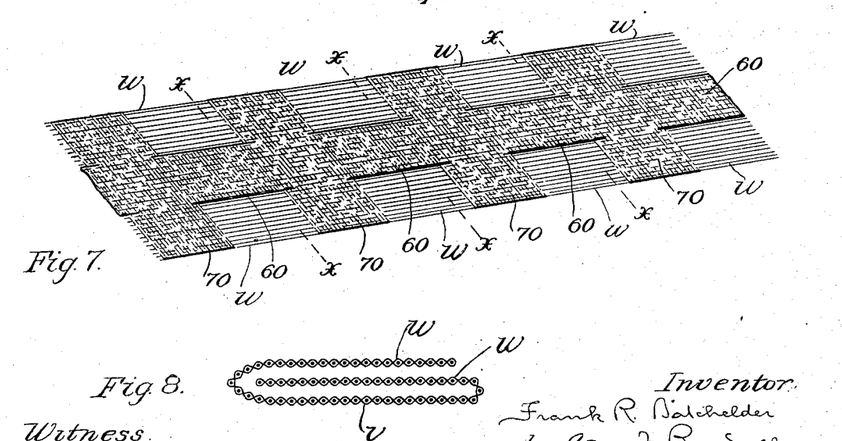
Fig. 7 illustrates one method of producing blanks like that of Fig. 6.
Fig. 8 illustrates a second method of producing such blanks.
Figure 9:
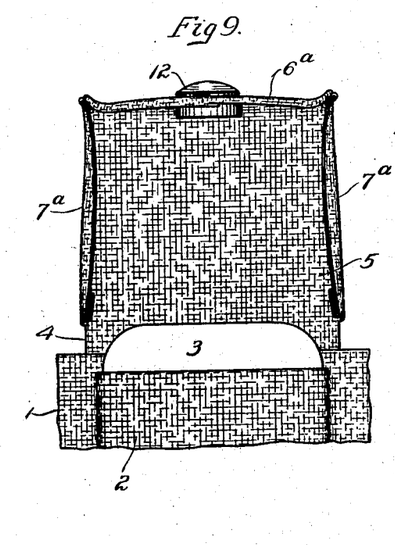
Figs. 9, 10, 11 are views corresponding in general with Figs. 1, 2, 3, but showing another embodiment, the lower portion of the pocket being omitted in Figs. 9 and 10.
Figure 10:
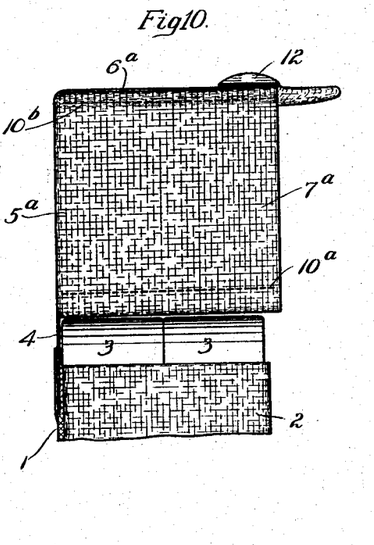
Figure 11:
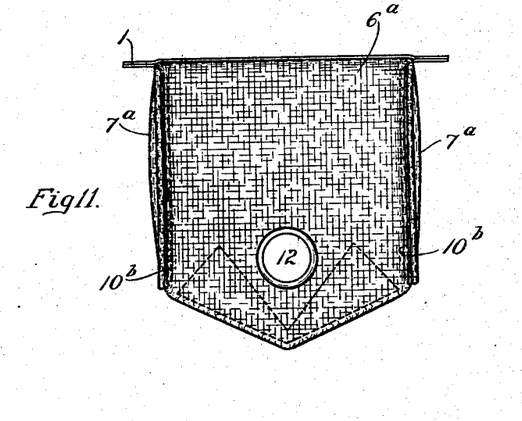
Figure 12:
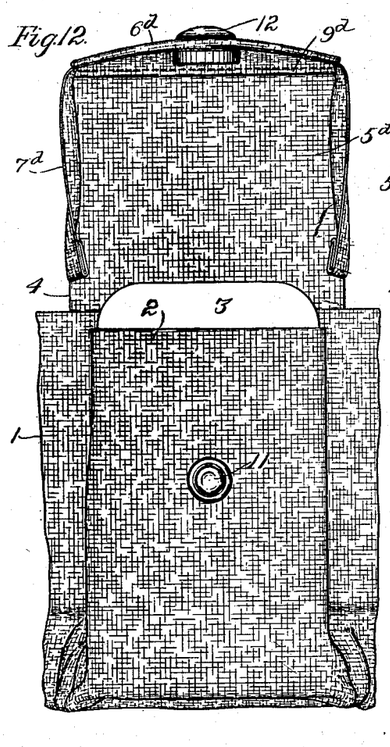
Figs. 12, 13, 14, 15, 16 are views corresponding in general with Figs. 1 to 5 but showing still another embodiment.
Figure 13:
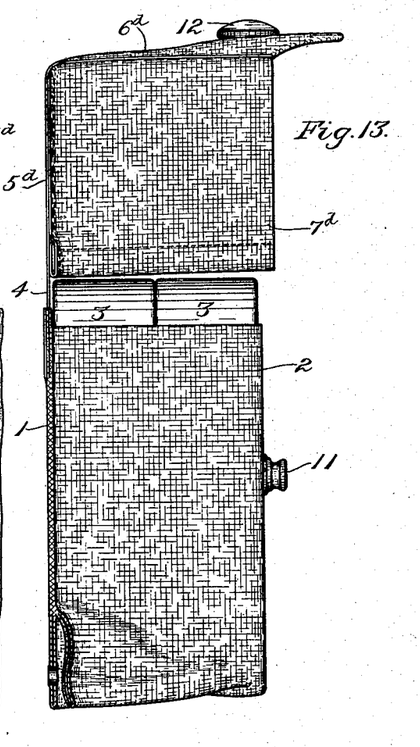
Figure 14:
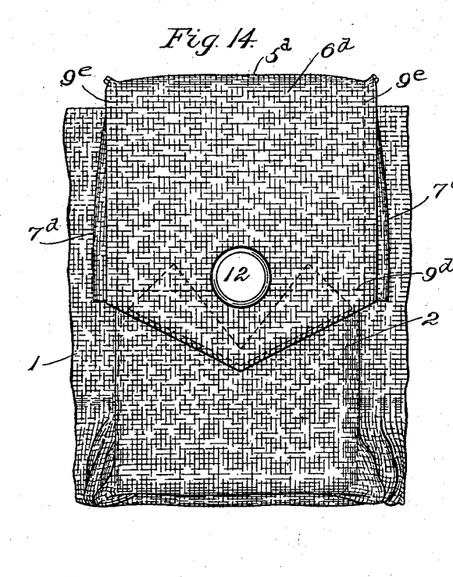
Figure 15:
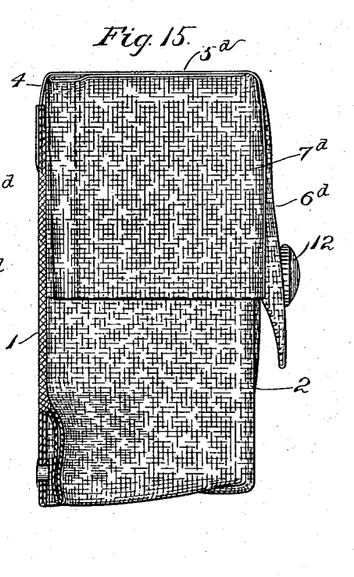
Figure 16:
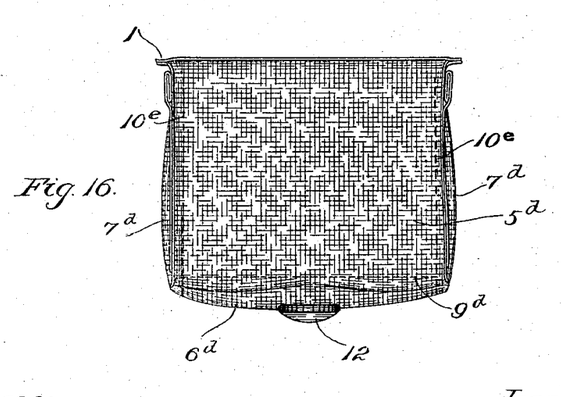

Fig. 6 shows a one-piece blank, shaped in the weaving, and Figs. 9, 10, 11 show a one-piece cover made of a blank like that of Fig. 6. In the case of this blank and cover, the side-wings or skirts $7^a$, $7^a$, and front $6^a$, are lateral and forward extensions, respectively, of the top $5^a$, and are integral with the latter. This particular blank may be produced by weaving a web like that shown in Fig. 7 composed of alternate narrow sections 60, 60, etc., and wide sections 70, 70, etc., and having the warp-threads $w$, $w$, etc., that are used in weaving the lateral wings of the wide sections floated and left unwoven between one wide section and the next, as shown, and after the removal of such web from the loom cutting it across on the lines $x$—$x$, $x$—$x$, etc., so as to separate it into a number of blanks. Such a web may be woven either in a flat state as in Fig. 7, extended transversely to its full width, or by well-known procedure it may be woven as in Fig. 8 with the wing-portions folded inward relative to each other and the intermediate portion of the web, so as to take up less width in the loom. After cutting the said web across on the lines $x$—$x$, $x$—$x$, etc., and trimming off the loose ends of warp-threads projecting from the transverse edges of the wings $7^a$, $7^a$, the blank will resemble that shown in Fig. 6, in having the extension $6^a$ for the front of the cover, the lateral wings $7^a$, $7^a$, for the side-wings or skirts of the cover, and the extension $4^a$ to serve in connecting the cover to the back wall of the pocket as explained hereinbefore. This blank will have firm selvaged edges at $6^b$, $6^b$, along the extension $6^a$, and at $7^b$, $7^b$, along the wing-extensions. The ends $6^c$, $4^c$, and front and rear ends $7^c$, $7^c$, of the wing-extensions will be cut or raw edges. In making the cover, the end $6^c$ will be folded back upon itself and stitched as in Fig. 11, the edges $7^c$, $7^c$, will be folded or hemmed and secured by the stitches $10^a$, $10^b$, as in Figs. 10 and 11, and the extension $4^a$ will be inserted into the housing-slit of the pocket-back and made fast therein. One edge of each wing-extension $7^a$ will be secured to the contiguous edge of the front-section by the line of stitches $10^b$. To permit the edges $7^c$, $7^c$, of the lateral wings to be folded back or hemmed as shown in Fig. 9, the blank is woven with longitudinal slits at $7^x$, $7^x$, $7^x$, $7^x$, Fig. 6, or such slits may be cut therein. The top $5^a$, and front $6^a$, are of a single thickness, and there are no seams required at either side of the top or at the forward edge of the same.

The embodiment shown in Figs. 12 to 16 is composed of two strips of webbing crossing each other at right angles as in the case of the embodiment shown in Figs. 1 to 5. It differs from the said embodiment shown in Figs. 1 to 5 mainly in the respect that whereas in the latter the intermediate portion of the transverse strip lies against one surface of the other strip in the top 5 of the cover or hood, in the embodiment shown in Figs. 12 to 16 the intermediate portion of the transverse strip lies against one surface of the other strip in the front $6^d$ of the cover or hood. The crossing portions of the two strips are fastened together by transverse lines $9^d$, $9^d$, Figs. 12, 14, 16, of stitching, and by lines $9^e$, $9^e$, Fig. 14, parallel with the edges of the strip extending from front to rear. The lateral edges of the top $5^d$ and the contiguous edges of the side-wings or skirts $7^d$, $7^d$, are secured together by continuations $10^e$, $10^e$, Fig. 16, of the lines $9^e$, $9^e$. At the back edges of the side-wings or skirts $7^d$, $7^d$, the ends of the transverse strip are folded or hemmed and stitched, to conceal, bind in, and protect the raw cut edges of such ends. Preferably, as in the case of the embodiment shown in Figs. 1 to 5, strips of webbing woven of the proper width, with firm woven selvages, are employed in the construction of the cover or hood, to render unnecessary folding or hemming of the longitudinal edges of such strips, and avoid bulkiness of the securing seams, and when a selvaged transverse strip is employed the lower edges of the side-wings or skirts are constituted by one of the selvages of the said strip. The fastening members 11, 12, are shown applied to the front of the pocket and the front of the cover or hood, as in the other embodiments that have been described.

In some cases, the strip that extends from front to rear may terminate at the front edge of the top $5^d$, and the intermediate portion of the transverse strip, alone, may constitute the front of the cover or hood. In embodiments of either of the types shown in Figs. 1 to 5, and Figs. 12 to 16, the transverse strip may lie outside the other strip, if such relative arrangement of the two strips is deemed desirable for any reason.

Figure 17:
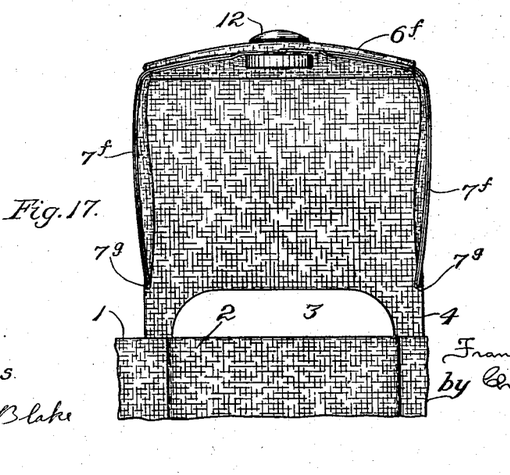
Fig. 17, Sheet 5, shows another embodiment.

In the embodiment shown in Fig. 17, Sheet 5, the construction resembles that of Figs. 12 to 16, except that at the outset the transverse strip is considerably longer than that of the latter views, and in making the cover such strip has its end-portions doubled back upon the intermediate portion so as to produce wings or skirts $7^f$, $7^f$, which are of two thicknesses. The extremities of the said doubled-back end-portions are inserted between the intermediate portion of such strip and the forward end-portion of the other strip, and are thus concealed in the front $6^f$ of the cover. The two thicknesses of the transverse strip are held together along their lower edges by stitches. The back-edges $7^g$, $7^g$, of the wings or skirts are constituted by the folds of the transverse strip.

Various other modifications may be made in the construction, mode of combining the parts, and in the manner of joining or uniting.

I claim as my invention:—

1. A carrier of woven material having a flexible pocket of woven fabric provided with a hood also of woven fabric, united flexibly to the back of the pocket, the said hood having a top of well-defined rectangularity corresponding in area with the cross-section of the filled pocket, a front extension having woven side-selvages, which extends down in front of the pocket, and side-skirts which are connected with the top and front of the hood and overlap and inclose the sides of the pocket, the said side-skirts consisting of integral portions of one and the same transversely-extending piece of fabric and having woven selvages, each side skirt secured along one selvaged edge thereof to a selvaged edge of an adjoining portion of the hood whereby the hood is shaped and is adapted to surround the upper portion of the filled and expanded pocket at both sides as well as the front.

2. A carrier of woven material having a flexible pocket of woven fabric provided with a hood also of woven fabric, united flexibly to the back of the pocket, and having a front extension having woven side-selvages, which extends down in front of the pocket, and side-skirts which are integral with a transverse portion of the hood-top and overlap and inclose the sides of the pocket, the said side-skirts secured along the front edges thereof to the corresponding woven selvages of the said front extension, whereby the hood is shaped and is adapted to surround the upper portion of the filled and expanded pocket at both sides as well as the front.

3. A woven carrier comprising a body-web, a woven pocket projecting from the face thereof, and a hood of flexible material adapted to surround and fit the upper portion of the filled and expanded pocket, comprising an attaching portion which is made fast to the body-web at the back of the pocket, a front extension having woven side-selvages, which extends down in front of the pocket, and deep side-skirts which extend alongside the sides of the pocket and are integral portions of the same transversely-extending piece of fabric, and means for fastening said hood in closed condition.

4. A woven carrier comprising a body-web, a woven pocket projecting from the face thereof, and an attached hood of flexible material which is secured by a rear extension thereof to the body-web, having a top of well-defined rectangularity, a front extension having woven side-selvages, which extends down in front of the front wall pocket, and side-skirts which unite at well-defined angles with the said top and extend down alongside the sides of the pocket, and prevent the existence of openings at the opposite sides of the covered pocket, and means for fastening the hood in closed condition.

5. A woven carrier having a pocket, and a cover therefor comprising a strip of flexible material having a rearward extension which is secured at the back of the pocket, and a transverse strip secured to the first-mentioned strip and having end-portions constituting side-wings or skirts of the cover, a portion of said cover forming also a cover-front, whereby a hood-like cover is provided.

6. A woven carrier having a pocket, and a hood-like cover therefor comprising a strip of flexible material which is secured by its rear end at the back of the pocket, an intermediate portion thereof constituting one thickness of the top of the cover, and a forward portion constituting the downturned front of the cover, and a transverse strip having end-portions which constitute side-wings or skirts of the cover and an intermediate portion constituting a second thickness of the cover-top.

In testimony whereof I affix my signature in presence of two witnesses.

FRANK R. BATCHELDER.

Witnesses:
CHAS. F. RANDALL,
EUGENE A. SISSON.

Copies of this patent may be obtained for five cents each, by addressing the "Commissioner of Patents, Washington, D. C."